(12) United States Patent
Beneditz

(10) Patent No.: US 11,140,003 B2
(45) Date of Patent: Oct. 5, 2021

(54) MAIN FEEDERS AS COMMS LINES

(71) Applicant: Hamilton Sundstrand Corporation, Charlotte, NC (US)

(72) Inventor: David Beneditz, Huntley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1 day.

(21) Appl. No.: 16/692,669

(22) Filed: Nov. 22, 2019

(65) Prior Publication Data
US 2021/0160094 A1    May 27, 2021

(51) Int. Cl.
*H04L 12/40* (2006.01)
*B64D 41/00* (2006.01)
*H04B 3/54* (2006.01)
*H02J 4/00* (2006.01)

(52) U.S. Cl.
CPC ........ *H04L 12/40032* (2013.01); *B64D 41/00* (2013.01); *H02J 4/00* (2013.01); *H04B 3/542* (2013.01); *H04L 12/40013* (2013.01); *B64D 2221/00* (2013.01); *H04L 2012/4028* (2013.01)

(58) Field of Classification Search
CPC ........ H04L 12/40032; H04L 12/40013; H04B 3/542; H02J 4/00; B64D 41/00
See application file for complete search history.

(56) References Cited

U.S. PATENT DOCUMENTS

| | | | |
|---|---|---|---|
| 7,761,069 B1 * | 7/2010 | Studenberg, Jr. | H04B 1/40 455/132 |
| 7,868,621 B2 | 1/2011 | Liu et al. | |
| 8,560,028 B1 * | 10/2013 | Mulbrook | H01Q 1/28 455/575.7 |
| 8,612,639 B1 * | 12/2013 | Righi | G06F 11/143 710/15 |
| 8,657,227 B1 * | 2/2014 | Bayliss | B64D 13/00 244/58 |
| 9,691,191 B1 * | 6/2017 | Righi | G07C 5/008 |
| 9,762,374 B1 * | 9/2017 | Li | H04B 3/54 |
| 10,291,287 B2 | 5/2019 | Kornek-Percin et al. | |
| 10,305,543 B2 | 5/2019 | Guillot | |
| 2008/0234838 A1 * | 9/2008 | Ghanekar | H02J 4/00 700/22 |
| 2008/0303353 A1 | 12/2008 | Yu | |
| 2011/0286534 A1 | 11/2011 | Hatakeyama | |
| 2020/0266855 A1 * | 8/2020 | Liu | H04L 12/40045 |

FOREIGN PATENT DOCUMENTS

EP    3444954 A1    2/2019

OTHER PUBLICATIONS

Search Report dated Mar. 29, 2021 in U381430EP Application No. EP20208487; p. 9.

* cited by examiner

*Primary Examiner* — Rasheed Gidado
(74) *Attorney, Agent, or Firm* — Cantor Colburn LLP

(57) ABSTRACT

A power system is provided and includes an electrical element, feeder lines by which the electrical element is receptive of first signals at first frequency ranges, first and second line replaceable units (LRUs) and first and second communications busses to couple the first and second LRUs to the feeder lines, respectively. The first and second LRUs are intercommunicative using second signals at second frequency ranges via the first and second communications busses and the feeder lines.

20 Claims, 5 Drawing Sheets

MAIN FEEDERS AS COMMS LINES

BACKGROUND

The following description relates to main feeders and, more specifically, to main feeders used as communications busses.

In certain applications, such as circuitry in aircrafts, line replaceable units (LRUs) and line replaceable modules (LRMs) are often provided. In aircrafts, in particular, recent efforts are underway to split generator control unit (GCU) functionality across separate LRUs and LRMs. In such cases, the LRUs and LRMs across which GCU functionality is split are still required to communicate with each other and with various types of components such as generators and contactors.

In an exemplary case, in which a generator is electrically coupled with a contactor by way of main feeders in a three-phase arrangement, a voltage regulator (VR) is one type of an LRU that is used to control operations of the generator and a protections element is another type of LRU that is used to control operations of the contactor. In a conventional scenario, the VR communicates with the protections element by way of dedicated communications lines to exchange built-in test (BIT) data, protection lockouts of VR, etc. In another exemplary case, in which the generator includes an exciter drive, a VR logic element and a protections element are other types of LRUs that are used to control operations of the generator with the exciter drive and the contactor. Here, in a conventional scenario, the VR logic element communicates with the protections element by way of dedicated communications lines to exchange pulse width modulation (PWM) control signals for the excite drive, BIT data, etc.

Further recent efforts at improving circuit performance, reliability and manufacturability have been dedicated toward reducing wiring and this has been especially true for aircrafts.

BRIEF DESCRIPTION

According to an aspect of the disclosure, a power system is provided and includes an electrical element, feeder lines by which the electrical element is receptive of first signals at first frequency ranges, first and second line replaceable units (LRUs) and first and second communications busses to couple the first and second LRUs to the feeder lines, respectively. The first and second LRUs are intercommunicative using second signals at second frequency ranges via the first and second communications busses and the feeder lines.

In accordance with additional or alternative embodiments, the feeder lines include three-phase wiring and the first and second communications busses each include first, second and third voltage monitor busses.

In accordance with additional or alternative embodiments, each of the first and second LRUs includes a communications controller and a bandpass filter electrically interposed between a corresponding communications bus and the communications controller.

In accordance with additional or alternative embodiments, the communications controllers of the first and second LRUs output the second signals to and receive the second signals from the first and second communications busses, respectively.

In accordance with additional or alternative embodiments, the second frequency ranges are substantially higher than the first frequency ranges.

According to an aspect of the disclosure, a power system is provided and includes first and second electrical elements, first feeder lines by which the first electrical element is receptive of first signals at first frequency ranges, second feeder lines by which the second electrical element is receptive of the first signals from the first electrical element, first and second line replaceable units (LRUs) and first and second communications busses to couple the first and second LRUs to the first and second feeder lines, respectively. The first and second LRUs are intercommunicative using second signals at second frequency ranges via the first and second communications busses and the first and second feeder lines.

In accordance with additional or alternative embodiments, the first and second feeder lines each include three-phase wiring and the first and second communications busses each include first, second and third voltage monitor busses.

In accordance with additional or alternative embodiments, each of the first and second LRUs includes a communications controller and a bandpass filter electrically interposed between a corresponding communications bus and the communications controller.

In accordance with additional or alternative embodiments, the communications controllers of the first and second LRUs output the second signals to and receive the second signals from the first and second communications busses, respectively.

In accordance with additional or alternative embodiments, the second frequency ranges are substantially higher than the first frequency ranges.

In accordance with additional or alternative embodiments, the second LRU executes predefined actions in an absence of intercommunications with the first LRU.

In accordance with additional or alternative embodiments, a communications line couples the first and second LRUs and the first and second LRUs are redundantly intercommunicative using the second signals.

According to an aspect of the disclosure, a power system is provided and includes first, second and third electrical elements, the first and third electrical elements being disposed in parallel and the second electrical element being disposed in series with the first and third electrical elements, first, second and third feeder lines respectively associated with the first, second and third electrical elements and by which the first, second and third electrical elements are receptive of first signals at first frequency ranges, first, second and third line replaceable units (LRUs) and first, second and third communications busses to couple the first, second and third LRUs to the first, second and third feeder lines, respectively. The first, second and third LRUs are intercommunicative using second signals at second frequency ranges via the first, second and third communications busses and the first, second and third feeder lines.

In accordance with additional or alternative embodiments, the first, second and third feeder lines each include three-phase wiring and the first, second and third communications busses each include first, second and third voltage monitor busses.

In accordance with additional or alternative embodiments, each of the first, second and third LRUs includes a communications controller and a bandpass filter electrically interposed between a corresponding communications bus and the communications controller.

In accordance with additional or alternative embodiments, the communications controllers of the first, second and third LRUs output the second signals to and receive the second signals from the first, second and third communications busses, respectively.

In accordance with additional or alternative embodiments, the second frequency ranges are substantially higher than the first frequency ranges.

In accordance with additional or alternative embodiments, the first, second and third electrical elements each include a contactor.

In accordance with additional or alternative embodiments, the first and third LRUs execute predefined actions whereby intercommunications using the second signals are always available between the second LRU and at least one of the first and third LRUs.

In accordance with additional or alternative embodiments, intercommunications using the second signals are simultaneously available between the first LRU and the second LRU and between the third LRU and the second LRU.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a power system is provided and may be configured as an aircraft power system, for example. The power system utilizes a broadband-over-power line structure or a power-line communications structure in which data and information is transmitted between LRUs by way of communications busses that are connected to main feeders. The main feeders serve as a common interface between two or more LRM/LRUs and allow for point of regulation (POR) monitoring, voltage monitoring, etc.

Figure 1:
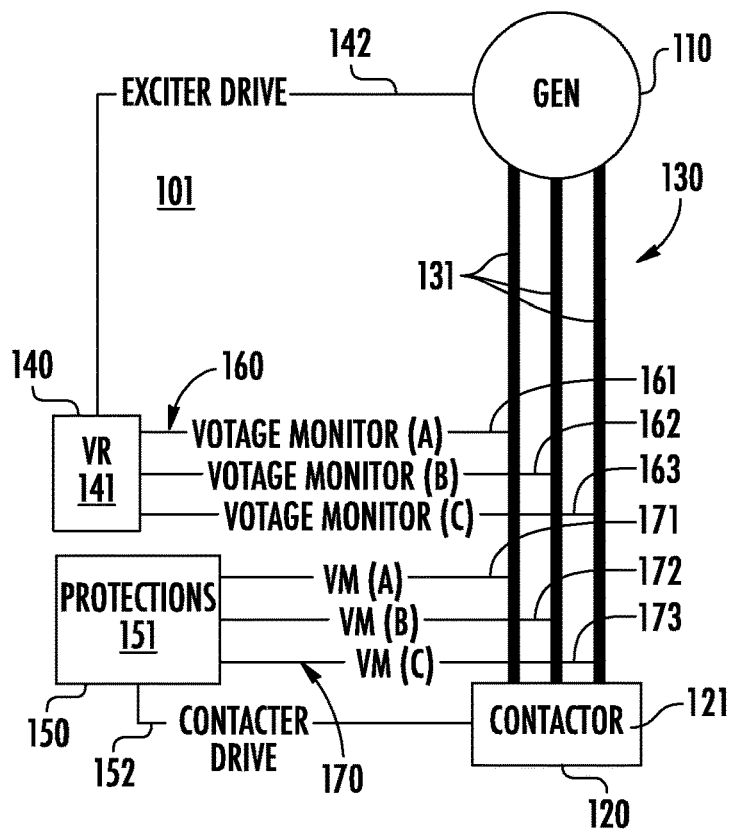
FIG. 1 is a schematic diagram of a circuit in which feeder lines are used as communications busses to allow for communications between LRUs in accordance with embodiments.

With reference to FIG. 1, a power system 101 is provided and includes a generator 110, an electrical element 120 that can be provided as a contactor 121 for example, feeder lines 130 by which the electrical element 120 is receptive of first signals from the generator 110 at first frequency ranges, first and second LRUs 140 and 150 and first and second communications busses 160 and 170. The feeder lines 130 can include there-phase wiring 131. The first communications busses 160 couple the first LRU 140 to the feeder lines 130 and include first, second and third voltage monitor busses 161, 162 and 163. The second communications busses 170 couple the second LRU 150 to the feeder lines 130 and include first, second and third voltage monitor busses 171, 172 and 173. With this configuration, the first and second LRUs 130 and 140 are disposed in intercommunication with each other using second signals at second frequency ranges via the first and second communications busses 160 and 170 and the feeder lines 130.

In accordance with embodiments, intercommunications between the first and second LRUs 130 and 140 that use the second signals at the second frequency ranges via the first and second communications busses 160 and 170 and the feeder lines 130 can be provided as exclusive intercommunications between the first and second LRUs 130 and 140 or as additional, secondary or redundant intercommunications. In the latter cases, additional or otherwise dedicated lines can be provided between the first and second LRUs 130 and 140.

In accordance with embodiments and, as shown in FIG. 1, the first LRU 140 can include or be provided as a voltage regulator (VR) 141, which is directly coupled to the generator 110 via an exciter drive line 142 whereby the VR 141 is capable of driving operations of the generator 110, and the second LRU 150 can include or be provided as a protections element 151, which is directly coupled to the contactor 121 via a contactor drive line 152 whereby the protections element 151 can open or close the contactor 121.

During operations of the power system 101, power is transmitted from the generator 110 to the contactor 121 along the feeder lines 130 at the first frequency ranges, which may be on the order of about 400 Hz, with the generator 110 being at least partially controlled by the VR 141 and the contactor 121 being open or closed by the protections element 151. While conventional power systems provide for dedicated wiring between the VR 141 and the protections element 151, intercommunications (exclusive or otherwise) between the VR 141 and the protections element 151 in this case use the second signals at the second frequency ranges, which may be on the order of kHz, MHz or higher (i.e., substantially higher than the first frequency ranges), via the first and second communications busses 160 and 170 as well as the feeder lines 130.

Because the intercommunications use the second signals at the second frequency ranges, the second signals do not interfere with communications between the generator 110 and the contractor 121. This is due to the fact that the contactor 121 in particular is not capable of recognizing or responding to the second signals. In addition, due to the differences between the first frequency ranges and the second frequency ranges, the second signals can be distinguished from the first signals by both the VR 141 and the protections element 151. This allows the VR 141 and the protections element 151 to exchange BIT data, protections lockouts, etc., without inhibiting the communications between the generator 110 and the contactor 121.

Figure 2:
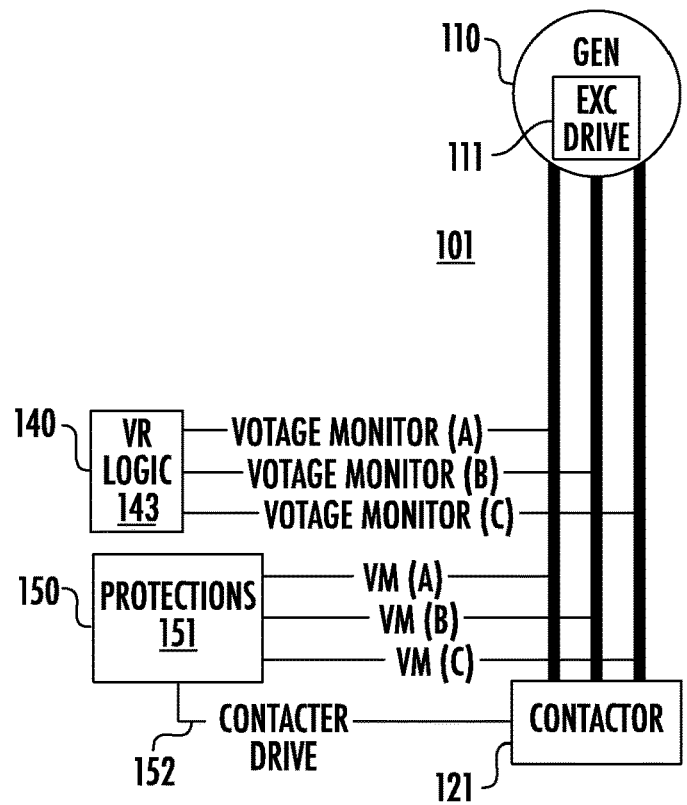
FIG. 2 is a schematic diagram of a circuit in which feeder lines are used as communications busses to allow for communications between LRUs in accordance with embodiments.

With reference to FIG. 2, the power system 101 is provided with a slightly different configuration. In this case, the generator 110 includes an exciter drive 111, the first LRU 140 can include or be provided as a VR logic element 143 and the second LRU 150 can again include or be provided as the protections element 151, which is, which is directly coupled to the contactor 121 via a contactor drive line 152. The power system 101 of FIG. 2 operates similarly as the power system 101 of FIG. 1 except that the VR logic element 143 and the protections element 151 can exchange PWM control signals for the exciter drive 111, BIT data, etc.

Figure 3:
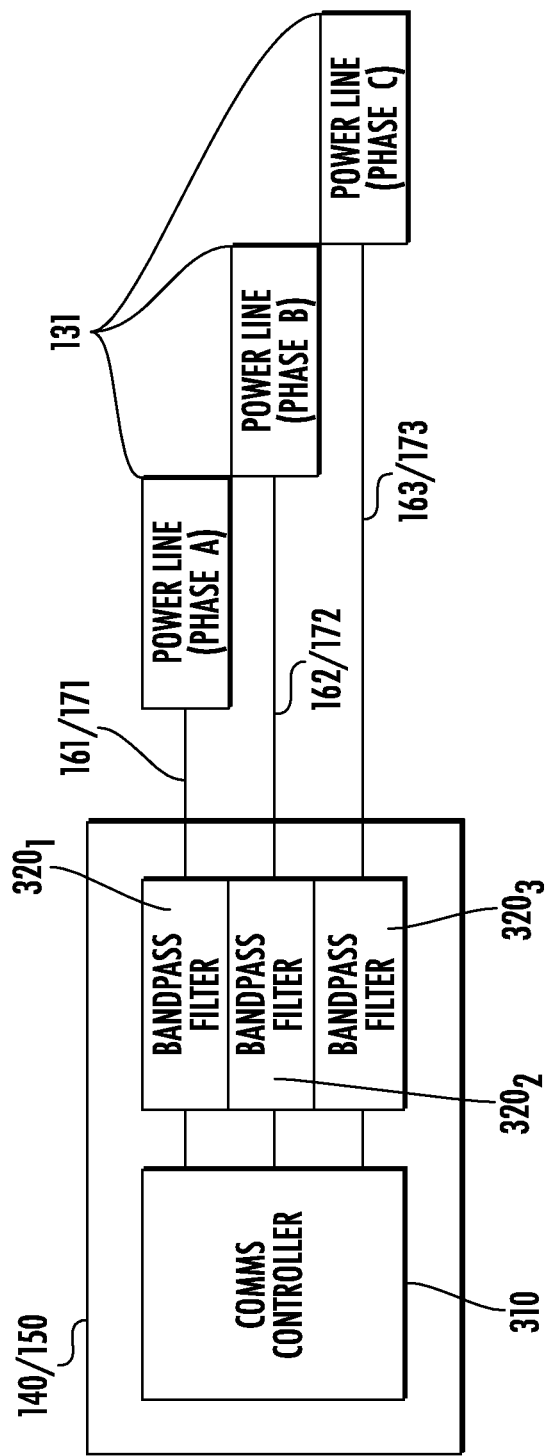
FIG. 3 is a schematic diagram illustrating a communications controller and bandpass filters of an LRU interface in accordance with embodiments.

With reference to FIG. 3, each of the first and second LRUs 140 and 150 of FIGS. 1 and 2 can include a communications controller 310 and bandpass filters $320_1$, $320_2$ and $320_3$, which are each electrically interposed between a corresponding one of the first, second and third voltage monitor busses 161/171, 162/172 and 163/173 and the communications controller 310. The communications controller 310 is disposed and configured to output the second signals to and to receive the second signals from the first, second and third voltage monitor busses 161/171, 162/172 and 163/173. The bandpass filters $320_1$, $320_2$ and $320_3$ are disposed and configured to block the first signals and other noise from the communications controller 310.

Figure 4:
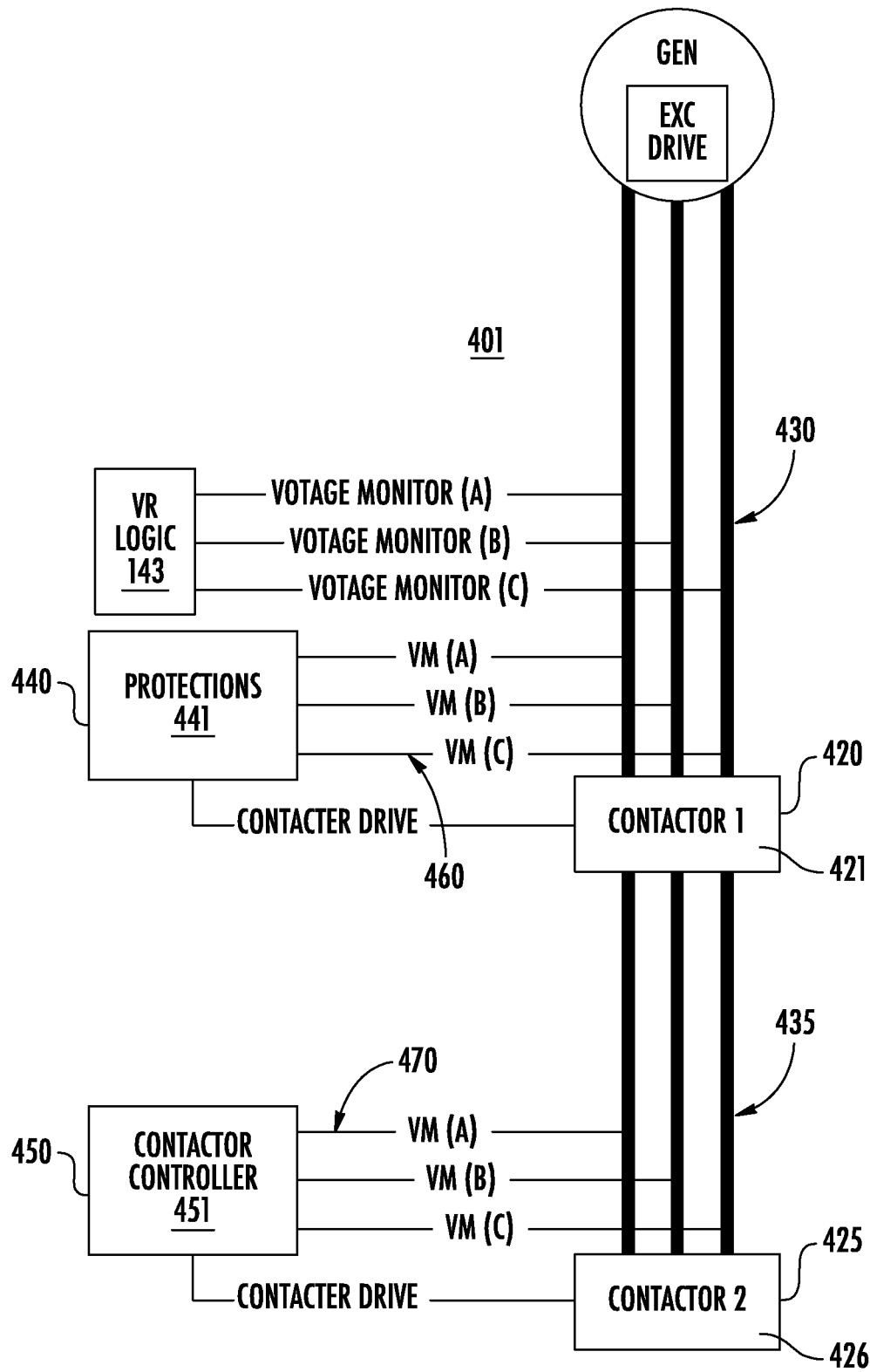
FIG. 4 is a schematic diagram of a circuit in which feeder lines are used as communications busses to allow for communications between LRUs in accordance with embodiments.
Figure 5:
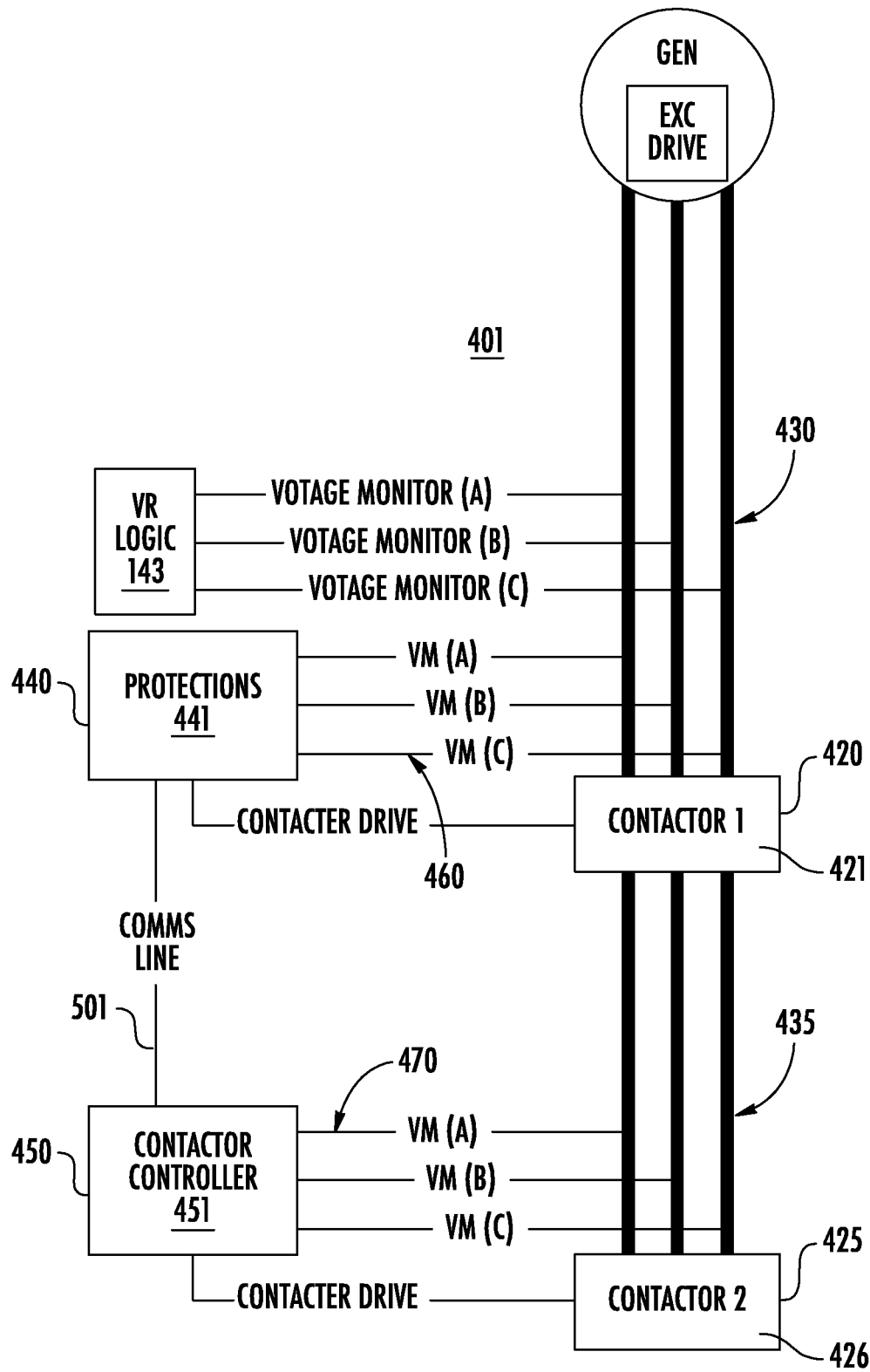
FIG. 5 is a schematic diagram of a circuit in which feeder lines are used as communications busses to allow for communications and for redundant communications between LRUs in accordance with embodiments.

With reference to FIGS. 4 and 5, further embodiments will now be described. In each case, the further embodiments will be based on the embodiments of FIG. 2 although it is to be understood that the further embodiments can be applied to various other embodiments as well. It is to be further understood that features of FIGS. 4 and 5 that have already been described above need not be described in detail below and thus descriptions of such features will be omitted.

As shown in FIG. 4, power system 401 includes first and second electrical elements 420 and 425, which are disposed in series and can include or be provided as first contactor 421 and second contactor 426, respectively, first feeder lines 430 by which the first electrical element 420 is receptive of first signals at first frequency ranges, second feeder lines 435 by which the second electrical element 425 is receptive of the first signals from the first electrical element 420, first and second LRUs 440 and 450 and first and second communications busses 460 and 470. The first LRU 440 can include or be provided as a protections element 441 and the first communications busses 460 couples the first LRU 440 to the first feeder lines 430. The second LRU 450 can include or be provided as a contactor controller 451 and the second communications busses 470 couples the second LRU 450 to the second feeder lines 435. The first and second LRUs 440 and 450 are intercommunicative using second signals at second frequency ranges via the first and second communications busses 460 and 470 and the first and second feeder lines 430 and 435.

In accordance with embodiments and, as shown in FIG. 4, the power system 401 can further include the VR logic element 143, which would be intercommunicative with the first electrical element 440 as described above.

In accordance with embodiments, the first and second LRUs 440 and 450 are intercommunicative with each other using the second signals and the second LRU 450 can be programmed with internal or system logic such that the second LRU 450 executes predefined actions in an absence of intercommunications with the first LRU 440 (i.e., when the intercommunications between the first and second LRUs 440 and 450 are cut off or otherwise unavailable). That is, in the case of the first and second electrical elements 420 and 425 being provided as the first and second contactors 421 and 426, respectively, whereby an opening of the first contactor 421 will effectively cut off any communications between the first LRU 440 and the second LRU 450, the second LRU 450 will be pre-programmed with internal or system logic to control the second contactor 426 to either remain closed or opened according to a predefined schedule or other inputs.

As shown in FIG. 5, the power system 401 further includes a dedicated line 501 to couple the first and second LRUs 440 and 450 (the presence of this dedicated line 501 does not and should not be interpreted as an indication that wiring is provided between the VR logic element 141 and the first LRU 440). In this case, the first and second LRUs 440 and 450 are effectively redundantly intercommunicative using the second signals. That is, the intercommunications between the first and second LRUs 440 and 450 using the second signals at the second frequency ranges via the first and second communications busses 460 and 470 and the first and second feeder lines 430 and 435 serve as redundant communications for the dedicated line 501. This can be particularly useful in an event the dedicated line 501 is broken or otherwise incapable of carrying information between the first and second LRUs 440 and 450.

Figure 6:
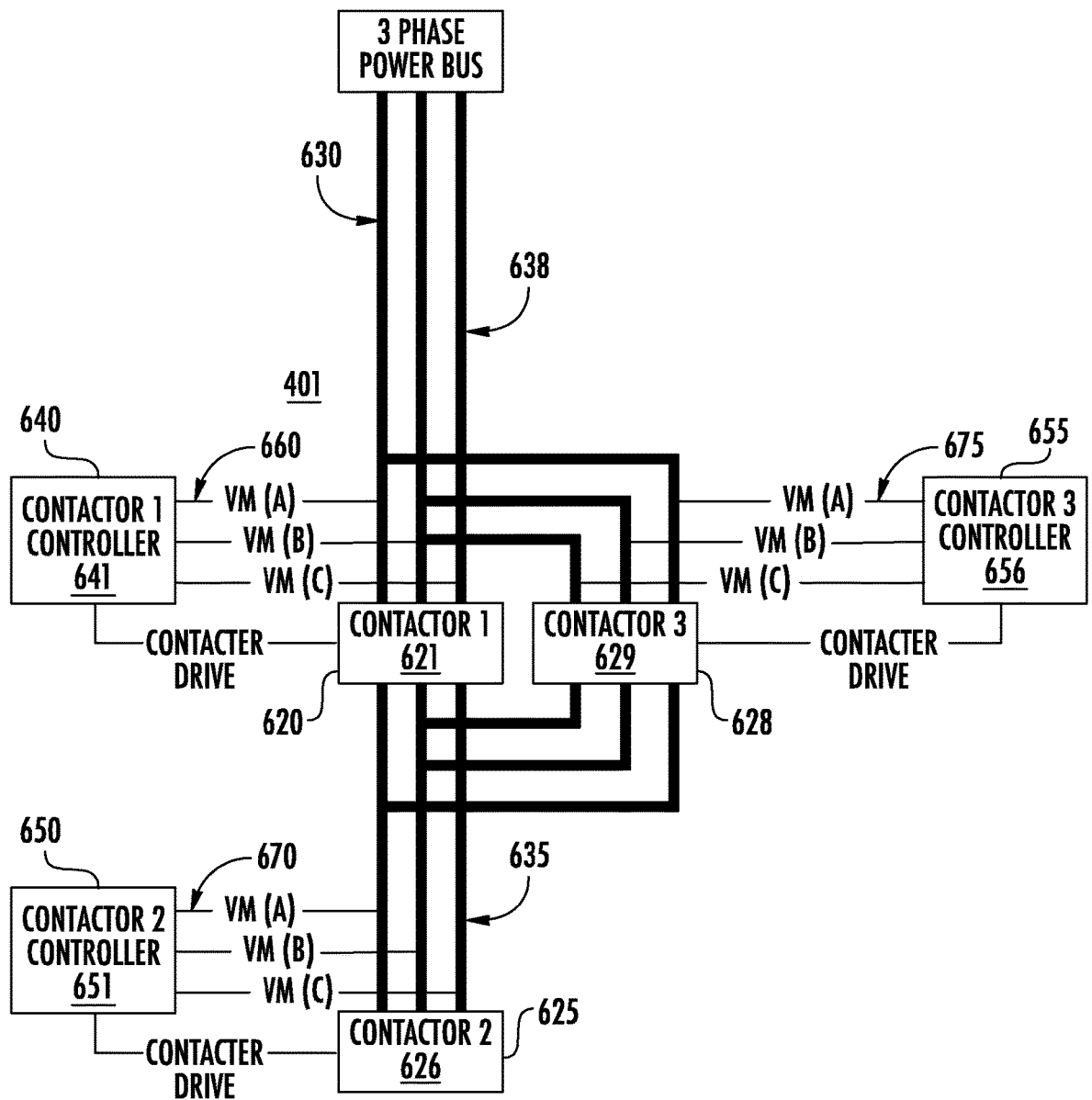
FIG. 6 is a schematic diagram of a circuit in which feeder lines are used as communications busses to allow for communications between LRUs in accordance with embodiments.

With reference to FIG. 6, further embodiments will now be described and it is to be understood that the further embodiments can be applied to various other embodiments. It is to be further understood that features of FIG. 6 that have already been described above need not be described in detail below and thus descriptions of such features will be omitted.

As shown in FIG. 6, power system 601 includes first, second and third electrical elements 620, 625 and 628, which can include or be provided as first, second and third contactors 621, 626 and 629. The first and third electrical elements 620 and 628 are disposed in parallel and the second electrical element 625 is disposed in series with the parallel first and third electrical elements 620 and 628. The power system 601 further includes first, second and third feeder lines 630, 635 and 638 that are respectively associated with the first, second and third electrical elements 620, 625 and 628 and by which the first, second and third electrical elements 620, 625 and 628 are receptive of first signals at first frequency ranges. In addition, the power system 601 includes first, second and third LRUs 640, 650 and 655, which can include or be provided as first, second and third contactor controllers 641, 651 and 656, respectively, and first, second and third communications busses 660, 670 and 675 to couple the first, second and third LRUs 640, 650 and 655 to the first, second and third feeder lines 630, 635 and 638, respectively. The first, second and third LRUs 640, 650 and 655 are intercommunicative using second signals at second frequency ranges via the first, second and third communications busses 660, 670 and 675 and the first, second and third feeder lines 630, 635 and 638.

In accordance with embodiments, the first, second and third electrical elements 620, 625 and 628 can each include or be provided as first contactor 621, second contactor 626 and third contactor 629, respectively, and the first, second and third LRUs 640, 650 and 655 can each include or be provided as first contactor controller 641, second contactor controller 651 and third contactor controller 656, respectively. In this or other cases, the first and third LRUs 640 and 655 can be programmed with internal or system logic to execute predefined actions whereby intercommunications using the second signals are always available between the second LRU 650 and at least one of the first and third LRUs 640 and 655. That is, in an event the first contactor 621 is open by the first contractor controller 641, the third contactor controller 656 will close the third contactor 629 whereby the second signals can be received by the second contactor controller 651 from at least the third contactor controller 656 (and vice versa). Alternatively, in an event the third contactor 629 is open by the third contractor controller 656, the first contactor controller 641 will close the first contactor 621 whereby the second signals can be received by the second contactor controller 651 from at least the first contactor controller 641 (and vice versa). On the other hand, in an event the first and third contactors 621 and 629 are both closed by the first and third contactor controllers 641 and 656, the second signals can be received by the second contactor controller 651 from at least the first and third contactor controllers 641 and 656.

Technical effects and benefits of the present disclosure are the provision of a power system characterized by aircraft wire reduction, increased redundancy (i.e., if three-phase main feeders are utilized for triple redundant data) and reduced failure modes. In addition, the power system can use frequency modulation to have multiple LRUs communicating on same lines with no bus contention issues.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A power system, comprising:
an electrical element;
feeder lines by which the electrical element is receptive of first signals at first frequency ranges;
first and second line replaceable units (LRUs); and
first and second communications busses to couple the first and second LRUs to the feeder lines, respectively,
the first and second LRUs being intercommunicative using second signals at second frequency ranges via the first and second communications busses and the feeder lines.

2. The power system according to claim 1, wherein:
the feeder lines comprise three-phase wiring, and
the first and second communications busses each comprise first, second and third voltage monitor busses.

3. The power system according to claim 1, wherein each of the first and second LRUs comprises:
a communications controller; and
a bandpass filter electrically interposed between a corresponding communications bus and the communications controller.

4. The power system according to claim 3, wherein the communications controllers of the first and second LRUs output the second signals to and receive the second signals from the first and second communications busses, respectively.

5. The power system according to claim 1, wherein the second frequency ranges are substantially higher than the first frequency ranges.

6. A power system, comprising:
first and second electrical elements;
first feeder lines by which the first electrical element is receptive of first signals at first frequency ranges;
second feeder lines by which the second electrical element is receptive of the first signals from the first electrical element;
first and second line replaceable units (LRUs); and
first and second communications busses to couple the first and second LRUs to the first and second feeder lines, respectively,
the first and second LRUs being intercommunicative using second signals at second frequency ranges via the first and second communications busses and the first and second feeder lines.

7. The power system according to claim 6, wherein:
the first and second feeder lines each comprise three-phase wiring, and
the first and second communications busses each comprise first, second and third voltage monitor busses.

8. The power system according to claim 6, wherein each of the first and second LRUs comprises:
a communications controller; and
a bandpass filter electrically interposed between a corresponding communications bus and the communications controller.

9. The power system according to claim 8, wherein the communications controllers of the first and second LRUs output the second signals to and receive the second signals from the first and second communications busses, respectively.

10. The power system according to claim 6, wherein the second frequency ranges are substantially higher than the first frequency ranges.

11. The power system according to claim 6, wherein the second LRU executes predefined actions in an absence of intercommunications with the first LRU.

12. The power system according to claim 6, further comprising a communications line to couple the first and second LRUs, wherein the first and second LRUs are redundantly intercommunicative using the second signals.

13. A power system, comprising:
first, second and third electrical elements, the first and third electrical elements being disposed in parallel and the second electrical element being disposed in series with the first and third electrical elements;
first, second and third feeder lines respectively associated with the first, second and third electrical elements and by which the first, second and third electrical elements are receptive of first signals at first frequency ranges;
first, second and third line replaceable units (LRUs);
first, second and third communications busses to couple the first, second and third LRUs to the first, second and third feeder lines, respectively; and
the first, second and third LRUs being intercommunicative using second signals at second frequency ranges via the first, second and third communications busses and the first, second and third feeder lines.

14. The power system according to claim 13, wherein:
the first, second and third feeder lines each comprise three-phase wiring, and
the first, second and third communications busses each comprise first, second and third voltage monitor busses.

15. The power system according to claim 13, wherein each of the first, second and third LRUs comprises:

a communications controller; and a bandpass filter electrically interposed between a corresponding communications bus and the communications controller.

16. The power system according to claim 15, wherein the communications controllers of the first, second and third LRUs output the second signals to and receive the second signals from the first, second and third communications busses, respectively.

17. The power system according to claim 13, wherein the second frequency ranges are substantially higher than the first frequency ranges.

18. The power system according to claim 13, wherein the first, second and third electrical elements each comprise a contactor.

19. The power system according to claim 18, wherein the first and third LRUs execute predefined actions whereby intercommunications using the second signals are always available between the second LRU and at least one of the first and third LRUs.

20. The power system according to claim 18, wherein intercommunications using the second signals are simultaneously available between the first LRU and the second LRU and between the third LRU and the second LRU.

* * * * *